(No Model.)

A. D. ESTIENNE.
MACHINE FOR DECORTICATING RAMIE OR OTHER PLANTS.

No. 531,307. Patented Dec. 25, 1894.

Witnesses:
L. M. Hachschlager
Fred E. Moise

Inventor
Alfred D. Estienne
By Briesen & Knauth
his Attorneys.

(No Model.) 5 Sheets—Sheet 4.

A. D. ESTIENNE.
MACHINE FOR DECORTICATING RAMIE OR OTHER PLANTS.

No. 531,307. Patented Dec. 25, 1894.

Witnesses:
L. M. Hachschlager,
Geo. C. Murray

Inventor
Alfred D. Estienne
By Briesen & Knauth
his Attorneys.

(No Model.)   5 Sheets—Sheet 5.
A. D. ESTIENNE.
MACHINE FOR DECORTICATING RAMIE OR OTHER PLANTS.
No. 531,307. Patented Dec. 25, 1894.
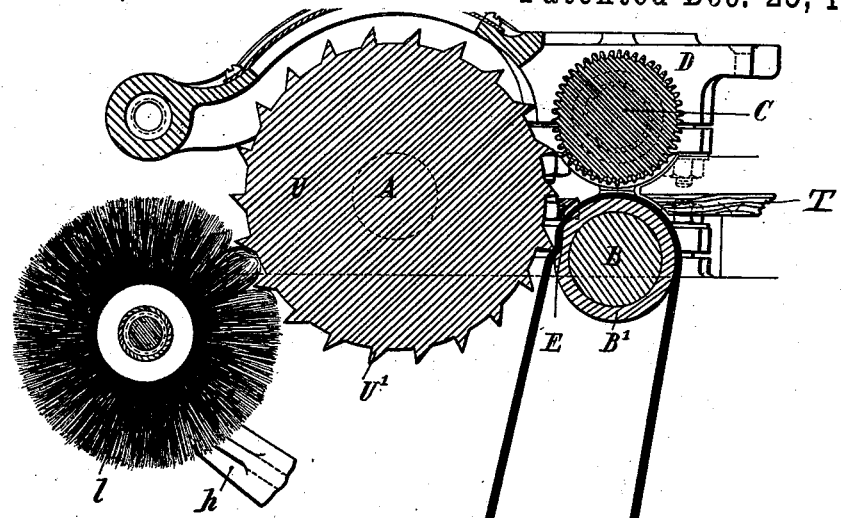
FIG. 5.
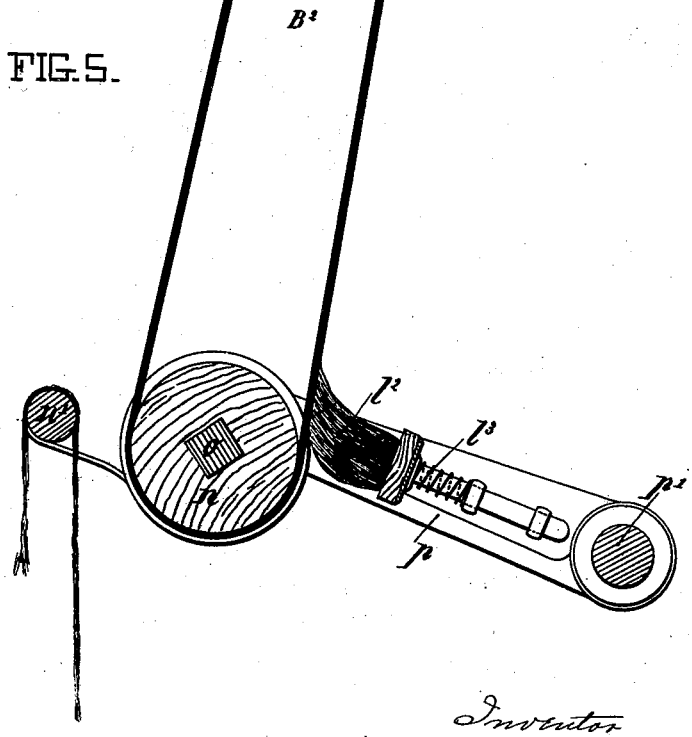
Witnesses:
L. M. Wachschlager
Geo. E. Morris
Inventor
Alfred D. Estienne
By Briesen & Knauth
his Attorneys.

UNITED STATES PATENT OFFICE.

ALFRED DIEUDONNÉ ESTIENNE, OF MARSEILLES, FRANCE.

MACHINE FOR DECORTICATING RAMIE OR OTHER PLANTS.

SPECIFICATION forming part of Letters Patent No. 531,307, dated December 25, 1894.

Application filed February 21, 1894. Serial No. 500,940. (No model.) Patented in France April 1, 1893, No. 229,095.

*To all whom it may concern:*

Be it known that I, ALFRED DIEUDONNÉ ESTIENNE, of the city of Marseilles, France, have invented an Improved Machine for Decorticating Ramie or other Plants, Leaves, and Textile Materials, (for which I have obtained Letters Patent in France for fifteen years, dated April 1,1893, No. 229,095,) of which the following is a full, clear, and exact description.

This invention relates to an improved machine for decorticating ramie and other plants, leaves, and textile materials.

The invention is illustrated in the accompanying drawings, forming part of this specification, in which—

Figure 1:
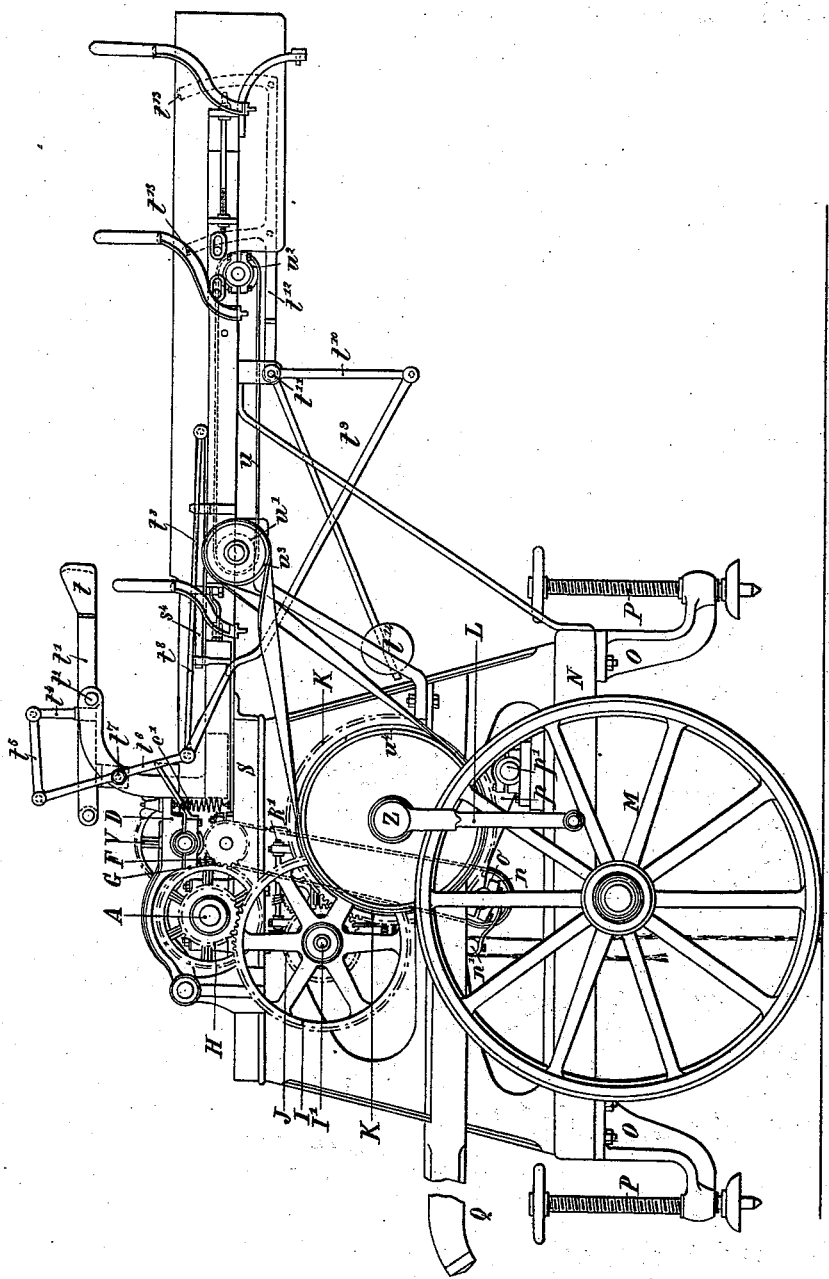
Figure 2:
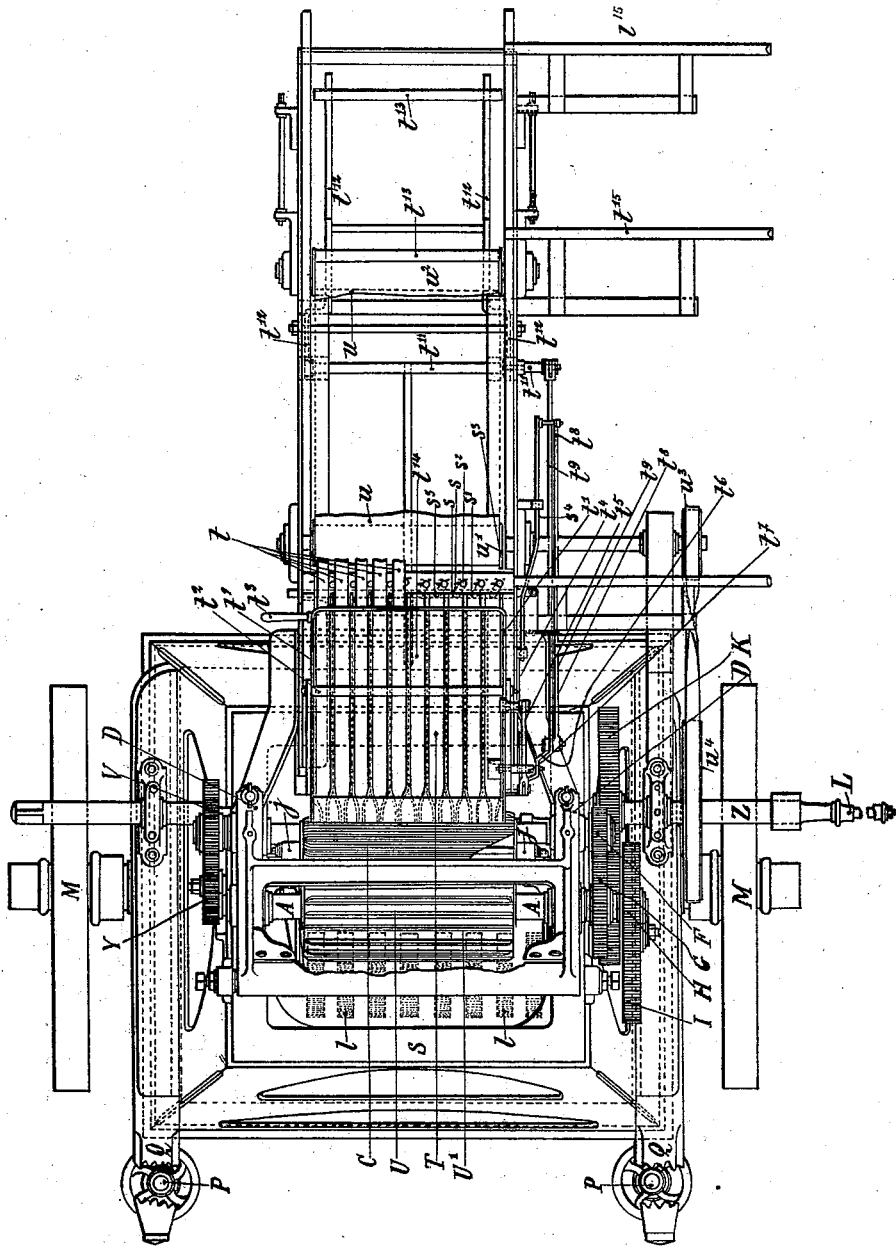
Figure 3:
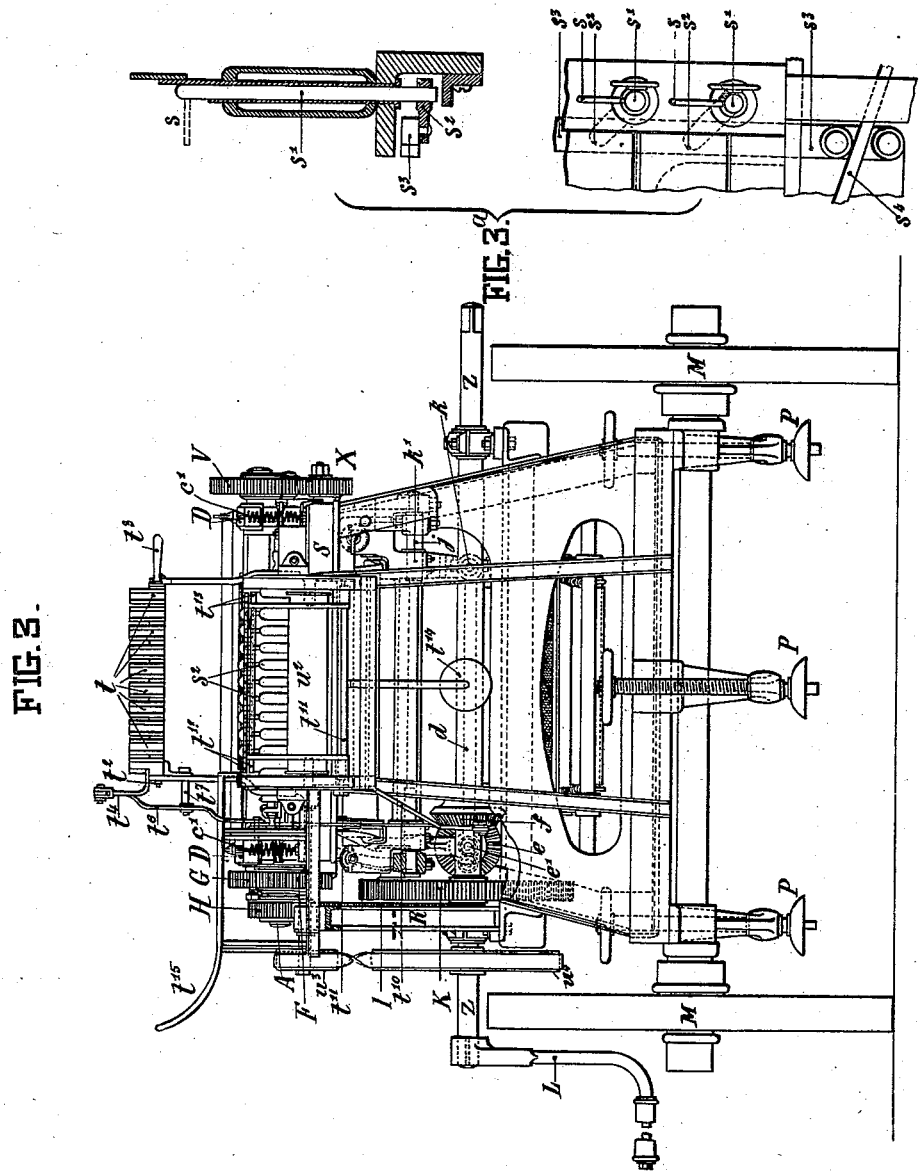
Figure 4:
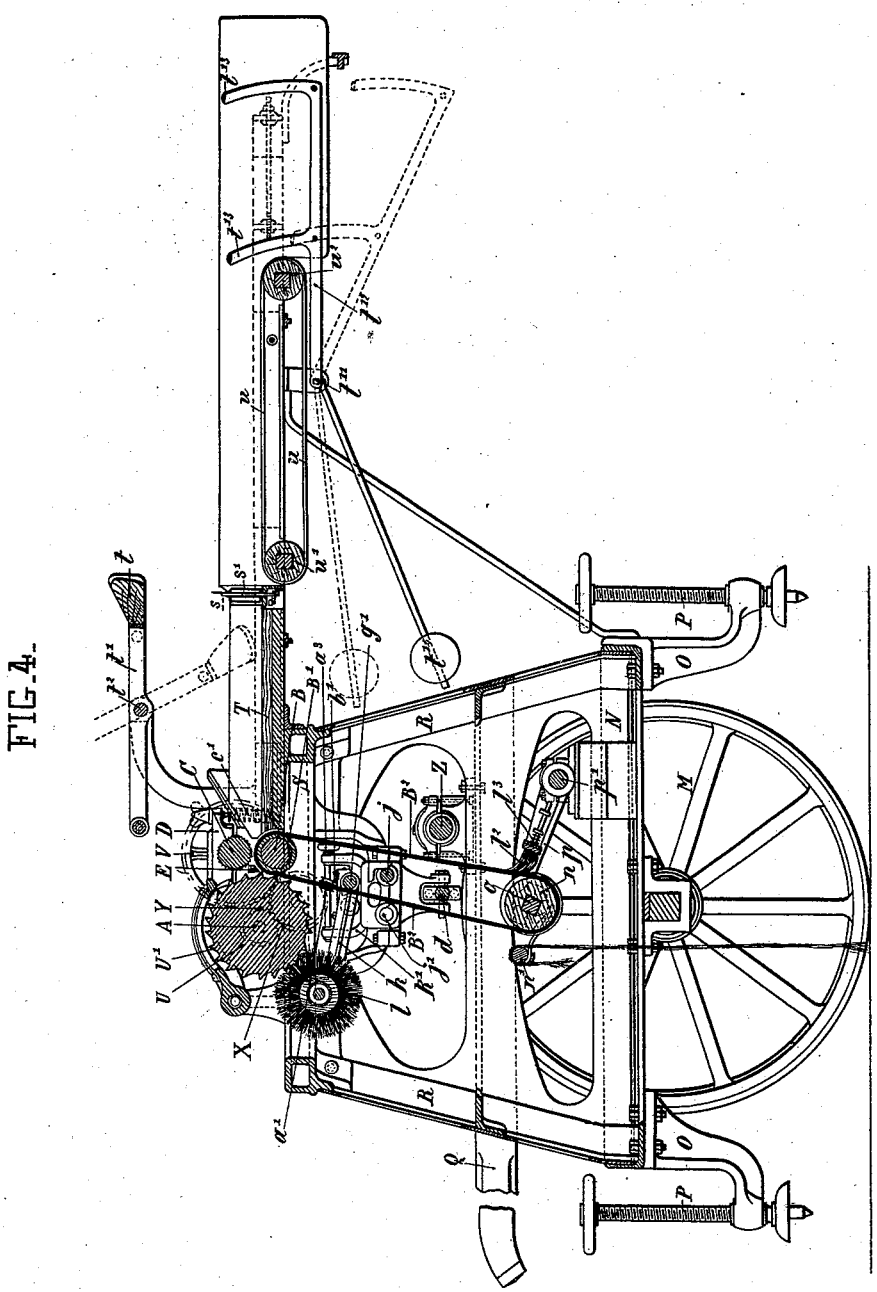

Figure 1 represents a side elevation, Fig. 2 a plan, and Fig. 3 a front view of the machine. Fig. 3ª shows detail views of a device situated at the rear end of the feed table. Fig. 4, is a longitudinal section of the machine. Fig. 5 is a section of the main operating parts drawn to a larger scale.

The machine is on wheels, and may be transported by manual, animal, or other power, so that it can follow up the operation of cutting the crop of stalks or leaves which may be decorticated as soon as cut. It may be operated by hand, as shown, or by a suitable motor.

The apparatus essentially comprises, as shown in Fig. 5, first, a beating or scutching drum U of metal, mounted on a shaft A turning in bearings, and provided with beaters U', also of metal, having blunt edges so as to avoid cutting the textile material; second, a plain roller B mounted in bearings and incased in india-rubber B', around which passes an endless apron B² made of india-rubber fabric, metal, or other material; third, a ribbed roller C whose ribs or teeth are blunted, said roller being mounted in bearings upon a pivoted frame D; fourth, a bed or bar E, which I term an anvil, made of triangular or other suitable form in cross-section, which is held in tension by means of two nuts or fixed in other suitable manner; fifth, a feed table T divided into several compartments to receive the stalks, which are to be passed between the two feed-rollers.

The beater drum U is operated by winch handles L on shaft Z through gear-wheel K in gear with a pinion J in one with a wheel I and both loose on the fixed shaft I'. The wheel I gears with a pinion H keyed on shaft A and transmits rotary motion to beater U. Upon shaft A is also mounted a wheel G, in gear with a pinion F on the axis of roller B. This roller B termed the feed and contact roller, thus receives rotary motion, the diameters of the gears being such that the bars of beater U and the endless apron upon roller B have the same surface speed at the point of contact, the rollers U and B, which are both mounted directly upon the framing S, revolving in opposite directions. The framing S is mounted upon an open framework R bolted to the base frame N supported by the axle of wheels M. To the base frame N are bolted the brackets O in which are screwed stanchions P whereby the machine is anchored in the ground when in use.

Q are horse-shafts, for enabling the machine to be moved from place to place. Upon the opposite end of shaft A is keyed a pinion Y in gear with an intermediate wheel X, loose upon its shaft, which gears in turn with a wheel V keyed on roller C, the proportions of the gears being such that the surface speed of the roller C is less than that of rollers U and B. The roller C revolves in the same direction as beater U and therefore in the reverse direction to the rubber-covered roller B, carrying the endless apron. The anvil E is placed above the roller B with the necessary play to avoid friction and so that the circle described by the extremities of the blades U' of beater U in rotating shall pass close to the anvil E.

The stalks to be decorticated are conducted automatically into the compartments of the feed table T by the following means: At the rear of the table T opposite each compartment is a small horizontal finger $s$ projecting from a vertical shank $s'$ capable of rotating upon its axis to the lower end of which is fixed a crank arm $s^2$, all these crank arms being coupled to a bar $s^3$ which is reciprocated by an inclined cam rod $s^4$. The stalks are directed into their respective compartments by corresponding grooves in guide bar $t$, supported at each end by a frame $t'$, pivoted upon a center $t^2$ and provided with a handle $t^3$. A bracket arm $t^4$ fixed to the side of the frame $t'$ is connected by a link $t^5$ to a lever $t^6$ pivoted at $t^7$ and connected by a link $t^8$ with the inclined cam rod $s^4$, which thus receives reciprocating motion in its guides. The lever $t^6$ is also connected by a link $t^9$ to the lever arm $t^{10}$ fixed upon a cross-shaft $t^{11}$ to which is fixed a frame $t^{12}$ provided with upwardly-projecting arms carrying two or more cross-bars $t^{13}$, the frame being balanced by a weight $t^{14}$. $u$ is an endless apron passing round two rollers $u'$, $u^2$ by which the stalks are fed forward. The roller $u'$ carries a pulley $u^3$ around which passes a belt from a pulley $u^4$ upon the winch handle shaft Z. The parts being in the position represented in Figs. 1 and $3^a$ the fingers $s$ close the compartments of the table T and while the stalks already contained are being decorticated, more stalks are placed with their smaller ends resting upon fingers $s$ and the other or larger ends supported according to their length by one or other of the cross-bars $t^{13}$, of the frame $t^{12}$, or the larger end may, if desired be first inserted. In order that these stalks may follow those which are being decorticated, the frame $t'$ is rocked on its axis $t^2$ by the handle $t^3$ so as to bring the guide $t$ immediately over the entrance to each compartment of table T, at the same time that the lever $t^6$ is oscillated upon its center $t^7$ which lever operates the cam $s^4$ through the link $t^8$. The cam $s^4$ by reason of its inclination moves the bar $s^3$ backward whereby the stems $s'$ are rotated and the fingers $s$ turned in a fore and aft direction, so that the forward ends of the stalks enter the compartments of table T. The lever $t^6$ at the same time oscillates the frame $t^{12}$ so as to lower the cross-bars $t^{13}$ and allow the ramie or other stalks to fall on to the apron by which they are carried forward on to the table T at a velocity greater than that of the upper feed roller C. On releasing the handle $t^3$ all the parts are returned to position by the balance weight $t^{14}$, the compartments of table T, being again closed by the fingers $s$ returning to their transverse position ready to receive fresh stalks, which are supplied from the rack $t^{15}$ within reach of the attendant. The fluted roller C is mounted in a pivoted frame D and can approach or recede from the roller B toward which it is pressed by springs $c'$. It acts so as, while slightly compressing them, to allow stalks of different diameters to pass. The stalks fed by the oppositely rotating rollers B C pass over the anvil E and the stalk which projects beyond or overhangs the whole of the same is broken by the impact of the blades U' of beater U, the woody portion or pith being thrown out without injury to the filaments for the free passage of which sufficient play is allowed between the blades and the anvil. During this operation the roller B turning at a greater velocity than the roller C above removes a portion of the skin from the under side of the stalks as it cannot impart its velocity to the stalks in which the ribs of roller C are embedded.

The roller C feeds the stalks at a rate corresponding to that of its surface speed, but prevents their being drawn in at a greater velocity, by the friction of the beater U and roller B. The blades U' may be formed on or attached to the beater drum U. Their action after having freed the stalks of the woody portion or pith is to seize the filaments, draw them out and force them to pass between the edges of the blades and the endless apron $B^2$ into which they are forcibly pressed. Since, as before mentioned the rollers U and B have the same surface speed, greater than that of the roller C and consequently greater than that of the stalks a continuous rubbing action is thus produced whereby any pellicle still remaining to the filaments is removed. The filaments thus cleaned being guided by the endless apron $B^2$ fall freely by their own gravity across a bar $n'$. The apron $B^2$ after passing around the rubber-case B' passes around the wood roller $n$ mounted on a shaft $o$, journaled in the ends of a pair of lever arms $p$ keyed on a shaft $p'$ mounted in bearings, the arms carrying the round bar $n'$ above mentioned upon which the filaments are received, which serves as a weight to keep the endless apron in tension.

In order to insure a continuous efficient action of the machine it is indispensable that the main parts should be kept perfectly clean. For this purpose a revolving brush $l$ is placed below and toward one side of the beater cylinder U, said brush being mounted in bearings on the ends of a pair of lever arms $h\,h'$ on a shaft $g'$ supported in bearings carried by the frame $k'$. The distance between the cleaning brush $l$ and the beater roller may be regulated by means of a hand wheel $a^3$ operating a worm $a'$ in gear with a segment $b'$ on the end of shaft $g'$, whereby the brush is moved toward or away from roller U, the action being the greater the closer the brush is brought to the roller. The disks of horse-hair of which the brush $l$ is composed are placed at suitable distances apart to allow of the waste falling through, the brush being rotated by contact with the beater U, and the brush spindle being free to turn in its bearings. The frame $k'$ receives longitudinal to and fro motion from the winch handle shaft Z through a bevel pinion $f$ gearing with a bevel pinion $e$ keyed upon a crank shaft $e'$ coupled by a connecting rod $d$ jointed at $k$ to the frame $k'$. The frame $k'$ is guided by the tie rods $j$, $j'$, the rod $j'$ being interrupted for a portion of its length so as not to obstruct the full breadth of the endless apron. The brush $l$ thus receives a rotary motion by contact with the beater and a bodily to and fro movement in the direction of its length so that the points in contact with the brush describe a double helicoidal line. The result of these combined movements is that the brush is subjected to little wear, and is self-cleaning, as it may be considered at rest as compared with the beater inasmuch as it rotates at the same speed as the beater. $l^2$ is a stationary horse-hair brush, supported by the levers $p$ carrying the bearings of the lower roller $n$ of the endless apron $B^2$, against which said brush is constantly pressed by the coiled springs $l^3$.

I claim—

1. In a decorticating machine the combination of a beater cylinder, a pair of feed rollers, an endless apron carried by one of said rollers, the other of said rollers being fluted, means for imparting to the beater cylinder and the endless apron the same surface speed, means for imparting to the fluted roller a slower surface speed than that of the cylinder and apron and a fixed bed bar or anvil, substantially as described.

2. In a machine for decorticating ramie and other plants, leaves or textile matters, the combination with the feed table divided into compartments, of the mechanism for supplying the stalks thereto, consisting of an endless apron, an oscillating frame whereby the stalks are deposited thereon, a grooved guide bar for the ends of the stalks and the horizontal fingers pivoted upon vertical axes, all as hereinbefore described.

The foregoing specification of my improved machine for decorticating ramie and other plants, leaves, and textile materials signed by me this 19th day of January, 1894.

ALFRED DIEUDONNÉ ESTIENNE.

Witnesses:
ROBERT, AMÉDÉE AUZET,
JOSEPH HENRI JOUQUS.